(12) United States Patent
Wei et al.

(10) Patent No.: US 12,068,775 B2
(45) Date of Patent: Aug. 20, 2024

(54) FREQUENCY HOPPING WITHIN A VIRTUAL BANDWIDTH PART

(71) Applicant: QUALCOMM Incorporated, San Diego, CA (US)

(72) Inventors: Chao Wei, Beijing (CN); Jing Dai, Beijing (CN); Peter Pui Lok Ang, San Diego, CA (US); Yi Huang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/758,459

(22) PCT Filed: Jan. 21, 2020

(86) PCT No.: PCT/CN2020/073394
§ 371 (c)(1),
(2) Date: Jul. 6, 2022

(87) PCT Pub. No.: WO2021/146887
PCT Pub. Date: Jul. 29, 2021

(65) Prior Publication Data
US 2023/0034062 A1 Feb. 2, 2023

(51) Int. Cl.
*H04B 1/7143* (2011.01)
(52) U.S. Cl.
CPC .................................. *H04B 1/7143* (2013.01)

(58) Field of Classification Search
CPC ..... H04B 1/7143; H04B 1/713; H04L 5/0092; H04L 5/0012
See application file for complete search history.

(56) References Cited

FOREIGN PATENT DOCUMENTS

| CN | 109842432 A | 6/2019 |
|---|---|---|
| EP | 3393147 A1 | 10/2018 |
| EP | 3799496 A1 | 3/2021 |
| KR | 20190013452 A | 2/2019 |
| WO | WO-2019049283 A1 | 3/2019 |
| WO | WO-2019165224 A1 | 8/2019 |
| WO | WO-2019242511 A1 | 12/2019 |

OTHER PUBLICATIONS

Machine translation of CN-112335269-A (Year: 2021).*
Supplementary European Search Report—EP20915761—Search Authority—Munich—Aug. 22, 2023.

(Continued)

*Primary Examiner* — Jean B Corrielus
(74) *Attorney, Agent, or Firm* — Harrity & Harrity, LLP

(57) ABSTRACT

Various aspects of the present disclosure generally relate to frequency hopping within a virtual BWP. In some aspects, a UE may determine a virtual bandwidth part (BWP) in which to frequency hop from a first narrow BWP to a second narrow BWP by a frequency offset. The virtual BWP may have a same subcarrier spacing as the first narrow BWP and a larger bandwidth than the first narrow BWP. The UE may perform communication based at least in part on frequency hopping within the virtual BWP. Numerous other aspects are provided.

30 Claims, 13 Drawing Sheets

(56) References Cited

OTHER PUBLICATIONS

Ericsson: "Clarification and Aligning of Terminologies on MSG3 (re) Transmission and RAR UL Grant in 38.211", 3GPP TSG-RAN WG1 Meeting #97, R1-1907736, Reno, Nevada, US, May 13-17, 2019, 3 Pages, Section 6.3.1.7.
Huawei, Hisilicon: "On Uplink Data Scheduling and Hopping", 3GPP TSG RAN WG1 Meeting NR#3, R1-1715714, Nagoya, Japan, Sep. 18-21, 2017, 3 Pages, Section 2.
International Search Report and Written Opinion—PCT/CN2020/073394—ISA/EPO—Oct. 27, 2020.

\* cited by examiner

| 2-bits FH Indicator | Frequency Domain Resource Assignment | | |
|---|---|---|---|
| | FDRA for non-FH (N bits) | FDRA for intra-BWP FH (N-1 bits) | FDRA for cross-BWP FH (N-1 bits) |
| 0 0 | 0 | | |
| 0 1 | | X | |
| 1 X | | | Y |

| FH Flag | Frequency Domain Resource Assignment | |
| --- | --- | --- |
| | Type 0 FDRA (N-1 bits) | Type 1 FDRA for non-FH (N-1 bits) |
| N.A. | 0 | |
| 0 | 1 | |
| 1 | 1 | Type 1 FDRA for intra-BWP FH (N-2 bits) X |

1102 →

| FH Flag | Frequency Domain Resource Assignment | |
| --- | --- | --- |
| | Type 0 FDRA (N-1 bits) | Type 1 FDRA for non-FH (N-1 bits) |
| 0 | 0 | |
| 0 | 1 | |
| 1 | X | Type 1 FDRA for cross-BWP FH (N-2 bits) Y |

1104 →

| FH Flag | FH Indicator | Frequency Domain Resource Assignment | | | |
| --- | --- | --- | --- | --- | --- |
| | | Type 0 FDRA (N-1 bits) | Type 1 FDRA for non-FH (N-1 bits) | Type 1 FDRA for intra-BWP FH (N-1 bits) | Type 1 FDRA for cross-BWP FH (N-1 bits) |
| 0 | 0 | 0 | | | |
| 0 | 0 | | 1 | | |
| 0 | 1 | | | X | |
| 1 | X | | | | Y |

FIG. 11

FREQUENCY HOPPING WITHIN A VIRTUAL BANDWIDTH PART

CROSS-REFERENCE TO RELATED APPLICATION

This application is a 35 U.S.C. § 371 U.S. national stage entry of International Application PCT/CN2020/073394, having an international filing date of Jan. 21, 2020, entitled "FREQUENCY HOPPING WITHIN A VIRTUAL BANDWIDTH PART," which is hereby expressly incorporated by reference herein.

FIELD OF THE DISCLOSURE

Aspects of the present disclosure generally relate to wireless communication and to techniques and apparatuses for hopping pattern for cross bandwidth part frequency hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a virtual bandwidth part (BWP) in which to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The method may include performing communication based at least in part on frequency hopping within the virtual BWP.

In some aspects, a method of wireless communication, performed by a base station, may include determining a BWP in which a UE is to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The method may include performing communication with the UE based at least in part on frequency hopping by the UE within the virtual BWP.

In some aspects, a UE for wireless communication may include memory and one or more processors operatively coupled to the memory. The memory and the one or more processors may be configured to determine a virtual BWP in which to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The memory and the one or more processors may be configured to perform communication based at least in part on frequency hopping within the virtual BWP.

In some aspects, a base station for wireless communication may include memory and one or more processors operatively coupled to the memory. The memory and the one or more processors may be configured to determine a virtual BWP in which a UE is to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The memory and the one or more processors may be configured to perform communication with the UE based at least in part on frequency hopping by the UE within the virtual BWP.

In some aspects, a non-transitory computer-readable medium may store one or more instructions for wireless communication. The one or more instructions, when executed by one or more processors of a UE, may cause the one or more processors to determine a virtual BWP in which to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The one or more instructions, when executed by the one or more processors of the UE, may cause the one or more processors to perform communication based at least in part on frequency hopping within the virtual BWP.

In some aspects, a non-transitory computer-readable medium may store one or more instructions for wireless communication. The one or more instructions, when executed by one or more processors of a base station, may cause the one or more processors to determine a virtual BWP in which a UE is to frequency hop from a first narrow BWP to a second narrow BWP by a frequency offset. The virtual BWP may have a same subcarrier spacing as the first narrow BWP, and a bandwidth of the virtual BWP may be larger than a bandwidth of the first narrow BWP. The one or more instructions, when executed by the one or more processors of the base station, may cause the one or more processors to perform communication with the UE based at least in part on frequency hopping by the UE within the virtual BWP.

In some aspects, an apparatus for wireless communication may include means for determining a virtual BWP in which to frequency hop from a first narrow BWP to a second narrow BWP by a frequency offset, where the virtual BWP has a same subcarrier spacing as the first narrow BWP, and a bandwidth of the virtual BWP may be larger than a bandwidth of the first narrow BWP, and means for performing communication based at least in part on frequency hopping within the virtual BWP.

In some aspects, an apparatus for wireless communication may include means for determining a virtual BWP in which a UE is to frequency hop from a first narrow BWP to a second narrow BWP by a frequency offset, where the virtual BWP has a same subcarrier spacing as the first narrow BWP, and a bandwidth of the virtual BWP may be larger than a bandwidth of the first narrow BWP, and means for performing communication with the UE based at least in part on frequency hopping by the UE within the virtual BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 illustrates an example bit table for indicating frequency hopping, in accordance with various aspects of the present invention.

FIG. 11 illustrates example bit tables for indicating a resource allocation, in accordance with various aspects of the present invention.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
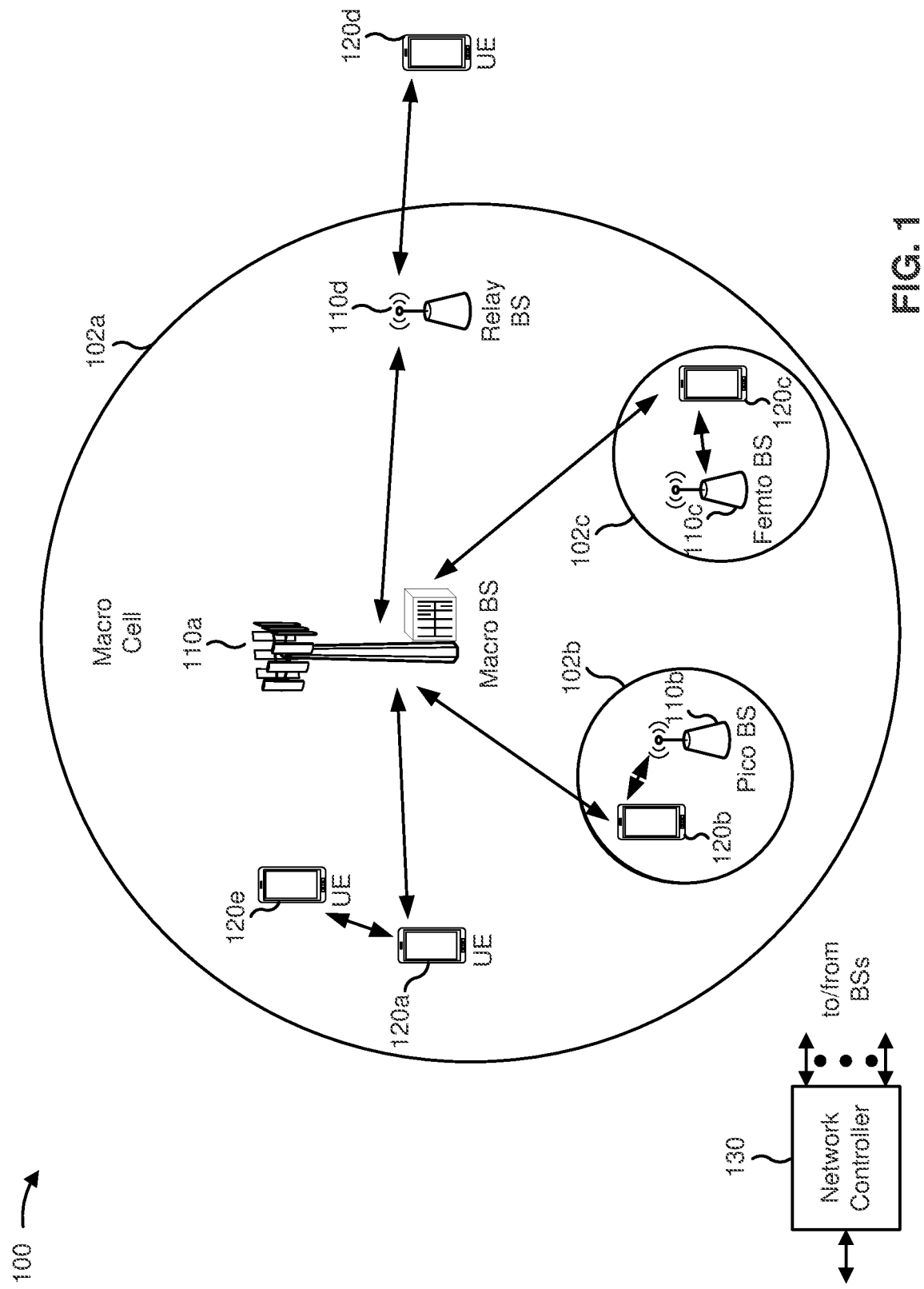
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
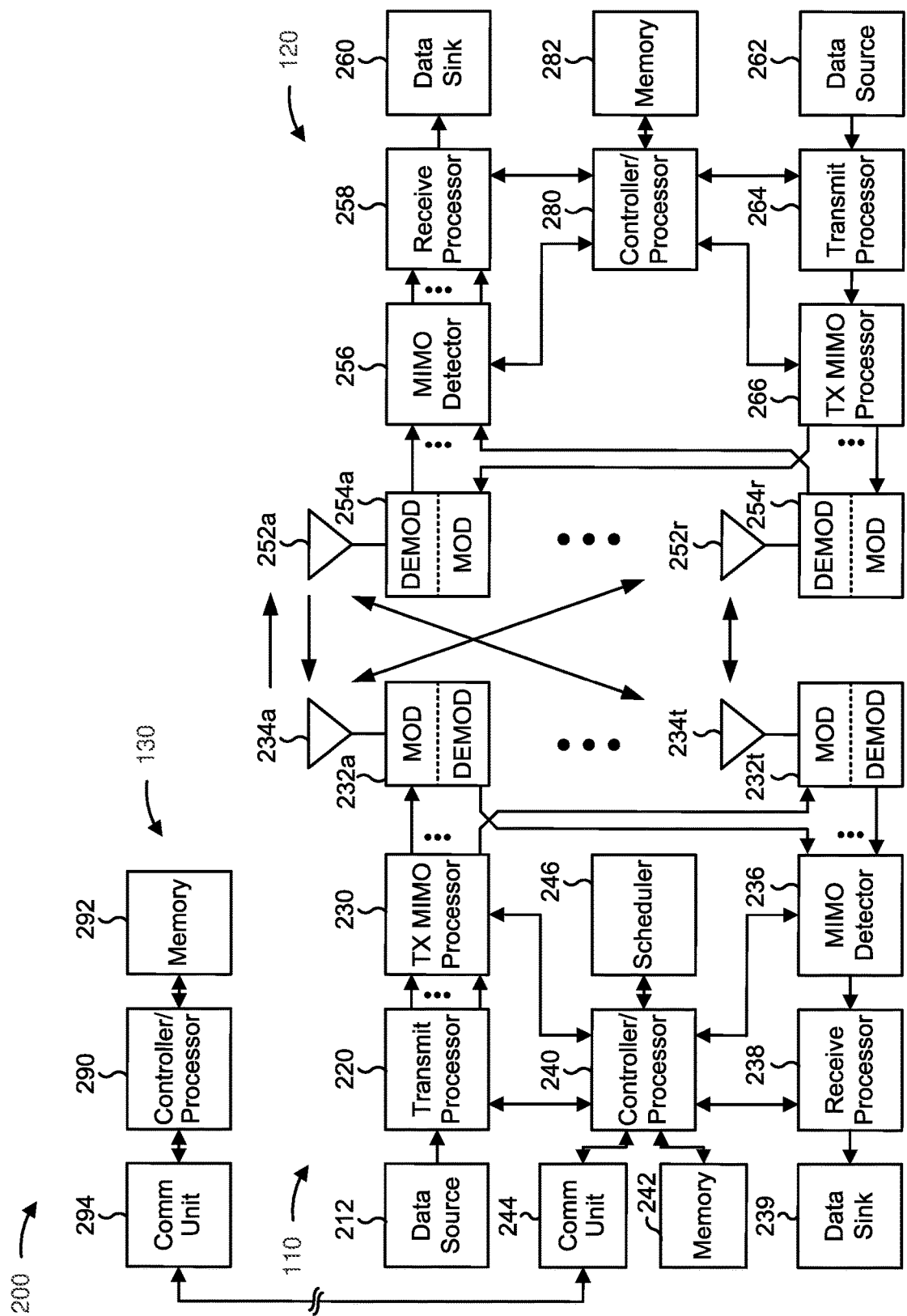
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a hopping pattern for cross bandwidth part (cross-BWP) frequency hopping, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, process 1300 of FIG. 13, and/or other processes as described herein. A scheduler 246 may schedule UEs for data transmission on the downlink and/or uplink.

In some aspects, UE 120 may include means for determining a virtual BWP in which to frequency hop from a first narrow BWP to a second narrow BWP by a frequency offset, where the virtual BWP has a same subcarrier spacing as the first narrow BWP, and a bandwidth of the virtual BWP may be larger than a bandwidth of the first narrow BWP, means for performing communication based at least in part on frequency hopping within the virtual BWP, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a virtual BWP in which a UE is to frequency hop from a first narrow BWP to a second narrow BWP by a frequency offset, where the virtual BWP has a same subcarrier spacing as the first narrow BWP, and a bandwidth of the virtual BWP may be larger than a bandwidth of the first narrow BWP, means for performing communication with the UE based at least in part on frequency hopping by the UE within the virtual BWP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
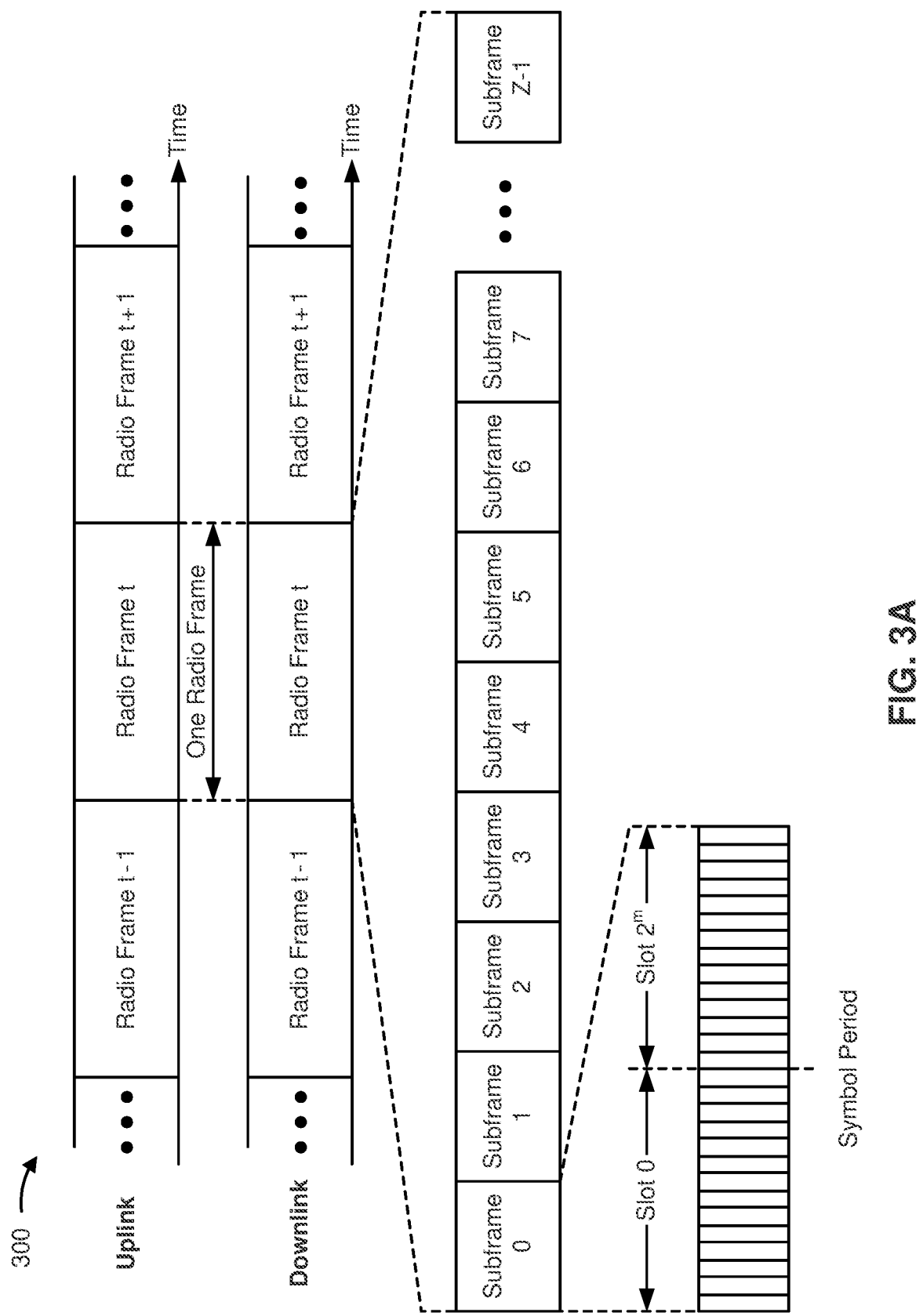
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
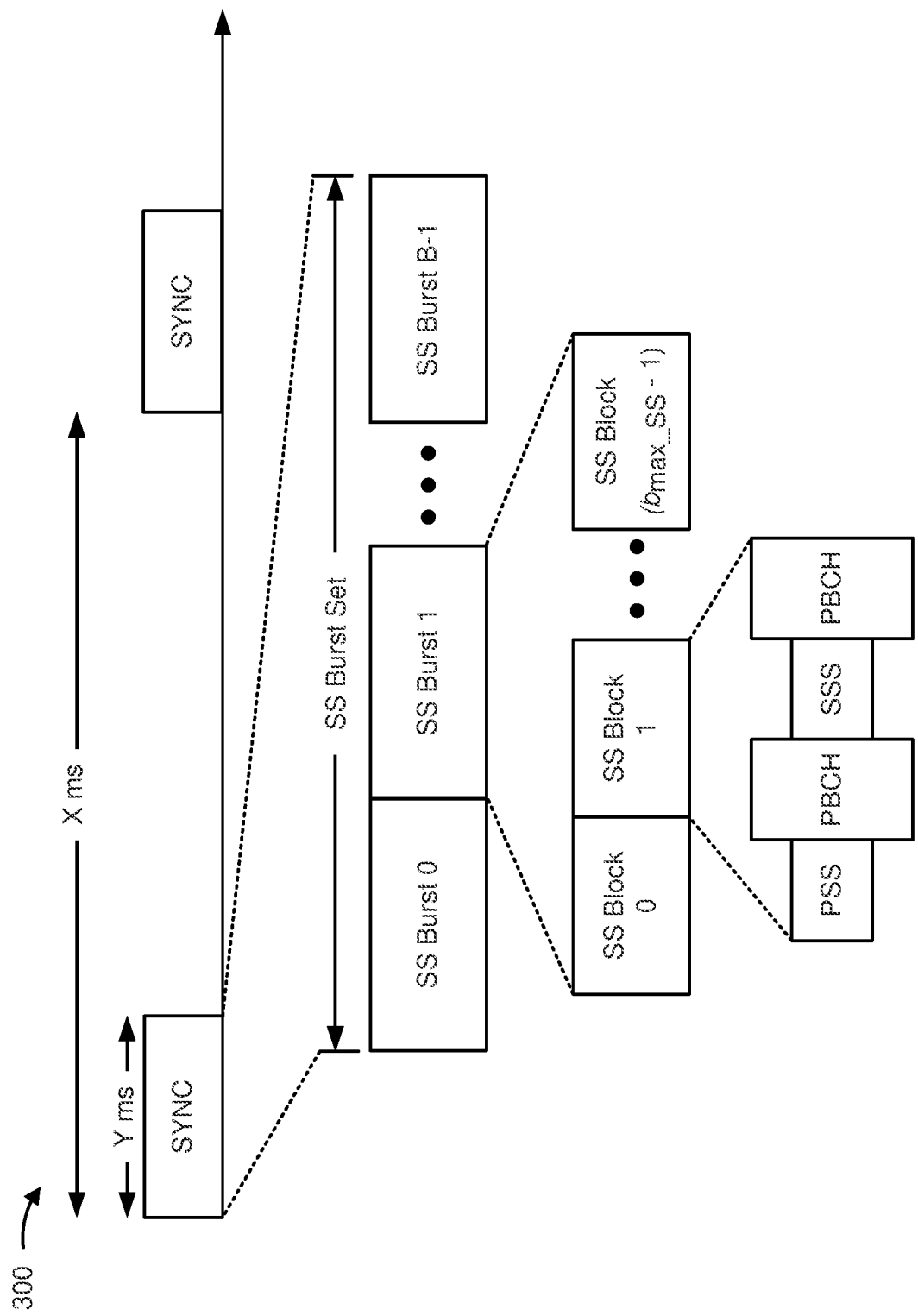
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
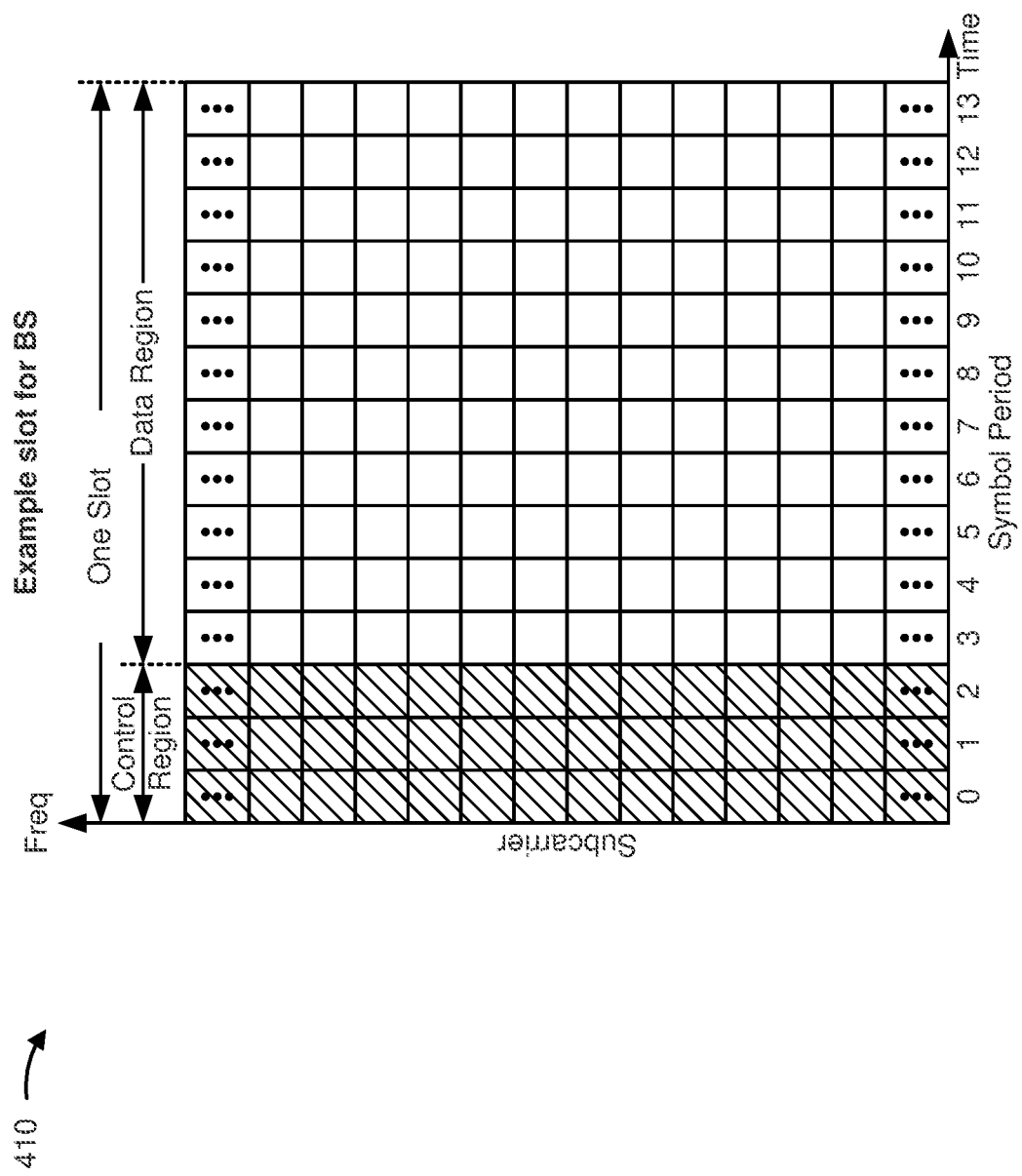
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink, and may include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, and may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Many devices, such as smart wearable devices, industrial sensors, and video surveillance devices, may be designed to operate using NR-Light, which is a part of 3GPP Release 17. NR-Light operations have less computational complexity and use fewer antennas as compared to normal NR operations. Peak throughput, latency, and reliability requirements may be relaxed. NR-Light UEs may also use less bandwidth. For example, an NR-Light UE may use bandwidths of 5 MHz-20 MHz as compared to an NR premium UE that uses a bandwidth of 50 MHz or 100 MHz. Networks may be designed so that NR premium UEs, including enhanced mobile broadband (eMBB) UEs, may coexist with NR-Light UEs.

A bandwidth part (BWP) may be a set of contiguous physical resource blocks on a carrier. A BWP allows a UE to transmit or receive with a narrower bandwidth than the entire carrier bandwidth. A UE may have a maximum BWP bandwidth (i.e., maximum channel bandwidth) that the UE may support, and this maximum may be set according to a capability of the UE. NR-light UEs may support smaller bandwidths than UEs that are capable of supporting wide bandwidths.

A BWP may be associated with a numerology (subcarrier spacing and cyclic prefix), a frequency location, and a bandwidth. A UE may be configured with up to 4 downlink (DL) BWPs and up to 4 uplink (UL) BWPs respectively, with only one DL BWP and one UL BWP active at any moment for a UE. While UEs that use BWPs may save power, UEs that use narrower BWPs may save more power because a baseband interface may operate with a lower sampling rate and with less baseband processing.

UEs that operate according to 3GPP Releases 15 and 16 are not able to transmit communications on a physical uplink shared channel (PUSCH) or a physical uplink control channel (PUCCH) outside of an active UL BWP, and such UEs are not able to receive communications on a physical downlink shared channel (PDSCH) outside of an active DL BWP. Transmission on the PUSCH or PUCCH with frequency hopping is also limited to within a BWP boundary.

Figure 5:
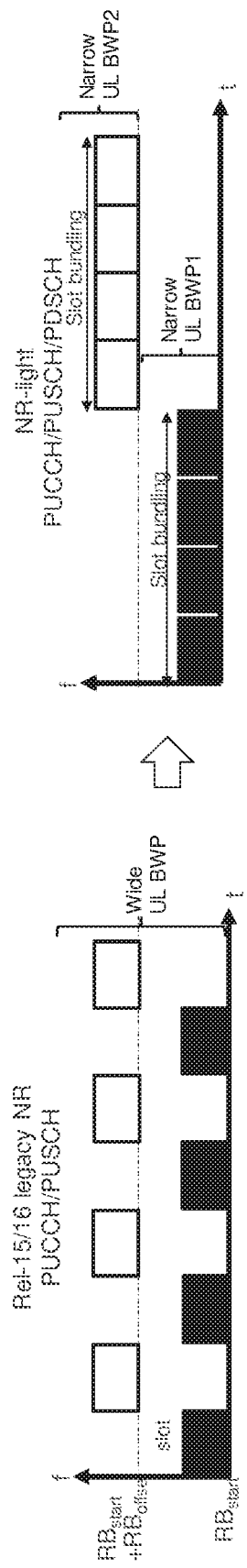
FIG. 5 illustrates an example of frequency hopping that is not limited to a bandwidth part (BWP) boundary.

FIG. 5 illustrates an example of frequency hopping that is not limited to a BWP boundary. As shown in FIG. 5, legacy NR, or NR as defined in 3GPP Releases 15 and 16, provides for intra-BWP UL frequency hopping. However, NR-Light UEs may have a reduced maximum bandwidth, and thus intra-BWP UL frequency hopping may have a limited diversity gain. Therefore, for the PUSCH, PUCCH, or PDSCH, frequency hopping may occur across BWPs, and this may be referred to as cross-BWP frequency hopping. Frequency hopping may also include bundling multiple slots of a radio frame into a single frequency hop to reduce frequency retuning times, which improves channel estimation and phase tracking. A frequency offset for a frequency hop may be indicated in a radio resource control (RRC) message or a downlink control information (DCI) message.

As indicated above, FIG. 5 is provided as an example. Other examples may differ from what is described with regard to FIG. 5.

A UE may perform cross-BWP frequency hopping, and do so with a configured offset. Frequency hopping across an UL carrier means that at least two BWP resources may need be reserved for NR-Light UE—an active BWP and an associated mirror part that is offset by a number of resource blocks (RBs).

Figure 6:
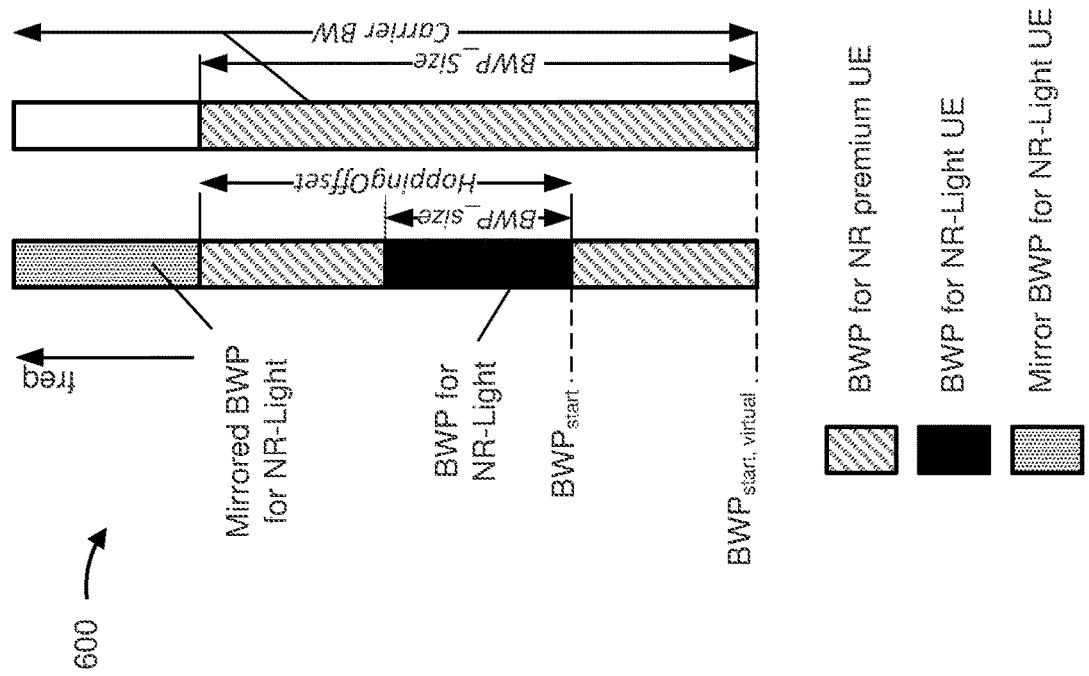
FIG. 6 shows an example of resources for frequency hopping by an NR-Light UE as compared to resources for an NR premium UE.

FIG. 6 shows an example 600 of resources for frequency hopping by an NR-Light UE as compared to resources for an NR premium UE.

An NR-Light UE may be operating with a subcarrier spacing (SCS) of 5-20 MHz and reduced complexity as compared to an NR premium UE that may operate with an SCS of 50 MHz or 100 MHz. The NR-Light UE may have an active BWP that is a narrow BWP. The active BWP of the NR premium UE may be larger than the active BWP of the NR-Light UE. An NR premium UE may have a bandwidth that is a maximum carrier bandwidth for a UE.

As shown in FIG. 6, an active BWP of the NR-Light UE and an associated mirror part are separated based at least in part on a frequency offset. Depending on the frequency offset and a starting RB of the active BWP, the active BWP and the associated mirror part may not fit fully within a wide BWP configured for the NR premium UE, and thus the NR-Light UE may not support efficient resource sharing with the NR premium UE. For example, when there are multiple narrow BWPs for different NR-Light UEs, the NR-Light UEs may not efficiently share resources with the premium UE, and processing and signaling resources may be wasted. Carrier-based inter-BWP hopping also increases scheduling complexity, because a base station (e.g., gNB) may need to consider a random access of two hops to avoid collision with the NR premium UE (although collisions may be avoided by assigning different resources in a grant when configuring the same frequency offset to UEs).

As indicated above, FIG. 6 is provided as an example. Other examples may differ from what is described with regard to FIG. 6.

According to various aspects described in the present disclosure, a UE may determine a virtual BWP for NR-Light UE frequency hopping. The virtual BWP may have the same subcarrier spacing as an active narrow BWP but have a larger bandwidth. A full length of a virtual BWP may not be an actual assigned BWP for activation. Rather, the virtual BWP may have an expanded virtual boundary for using frequency hopping resources. A restriction on available resources for an assigned bandwidth may be removed such that resource selection for a next hop may effectively wrap around an end of the assigned bandwidth and return to another portion of the assigned bandwidth. As a result, the available bandwidth of the virtual BWP may appear to be larger than the assigned bandwidth of the UE. In this way, an NR-Light UE may use resources that better align with a BWP of an NR Premium UE. For example, a first BWP (e.g., active narrow BWP) and a hop to a second BWP (e.g., associated mirror narrow BWP) by a frequency offset may fit within the virtual BWP for BWP assignment purposes. The NR-Light UE may better match resource use with the NR premium UE, and the NR-Light UE and the NR premium UE may not waste power and processing resources.

Figure 7:
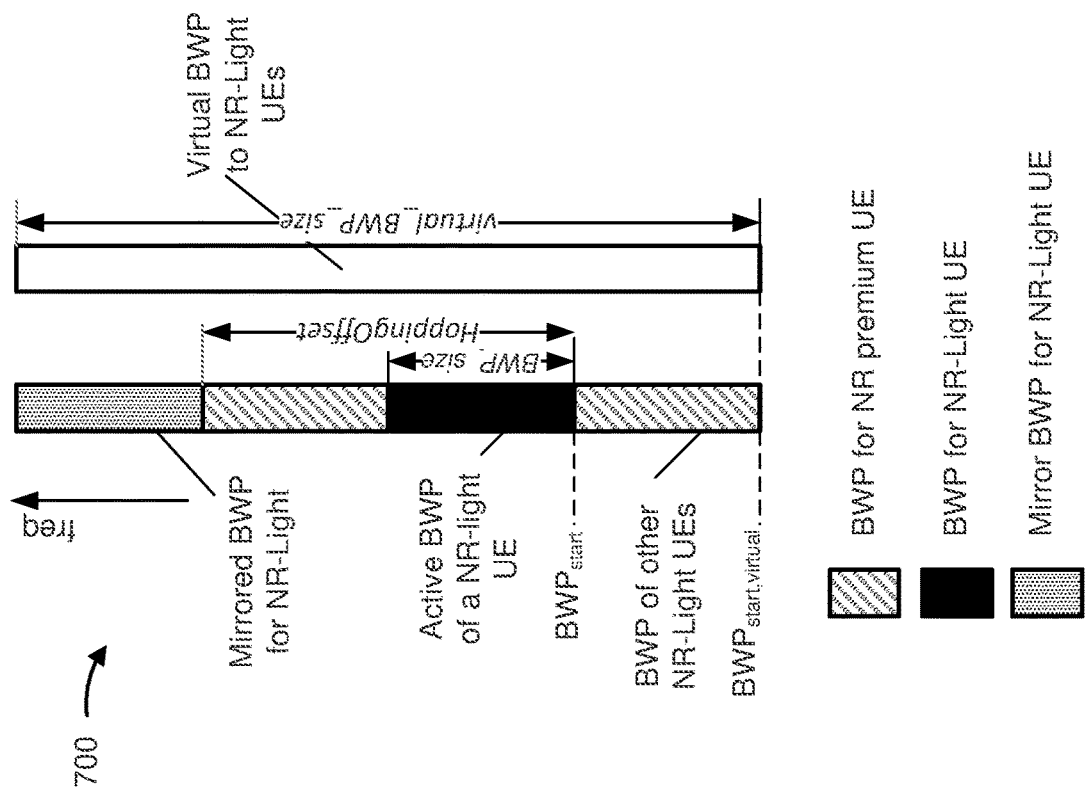
FIG. 7 shows an example of a virtual BWP for frequency hopping, in accordance with various aspects of the present disclosure.

FIG. 7 shows an example 700 of a virtual BWP for frequency hopping, in accordance with various aspects of the present disclosure.

As shown in FIG. 7, a size of a virtual BWP may extend in size beyond a size of an assigned or scheduled BWP for an NR premium UE. The virtual BWP may have a same subcarrier spacing as a narrow BWP of an NR-Light UE but have a different starting frequency location and bandwidth than the narrow BWP. The virtual BWP may have a larger bandwidth than the narrow BWP. The NR-Light UE may determine a starting frequency resource (e.g., resource block (RB)) after cross-BWP hopping based at least in part on the virtual BWP. For example, the NR-Light UE may determine a starting RB within the virtual BWP before frequency hopping. The starting RB may be represented by $RB'_{start}$, where $RB'_{start} = (RB_{start} + N_{BWP}^{start} - N_{virtual\_BWP}^{start}) \bmod N_{virtual\_BWP}^{size}$. The starting RB after cross-BWP FH may be given by $(RB'_{start} + RB_{offset}) \bmod N_{virtual\_BWP}^{size}$ where $RB_{start}$ is the starting RB within the UL BWP based on the DCI, $N_{BWP}^{start}$ is the starting position of narrow BWP for NR-Light UE, $N_{virtual\_BWP}^{start}$ is the starting position of configured virtual BWP and $N_{virtual\_BWP}^{size}$ is the bandwidth of virtual BWP. In some aspects, the virtual BWP may be the UL BWP configured for the NR premium UE, and the same virtual BWP may be configured for multiple NR-Light UEs with different narrow BWPs. That is, from a network perspective, resources of the virtual BWP may be shared by the NR premium UE and the NR-Light UE.

As indicated above, FIG. 7 is provided as an example. Other examples may differ from what is described with regard to FIG. 7.

Figure 8:
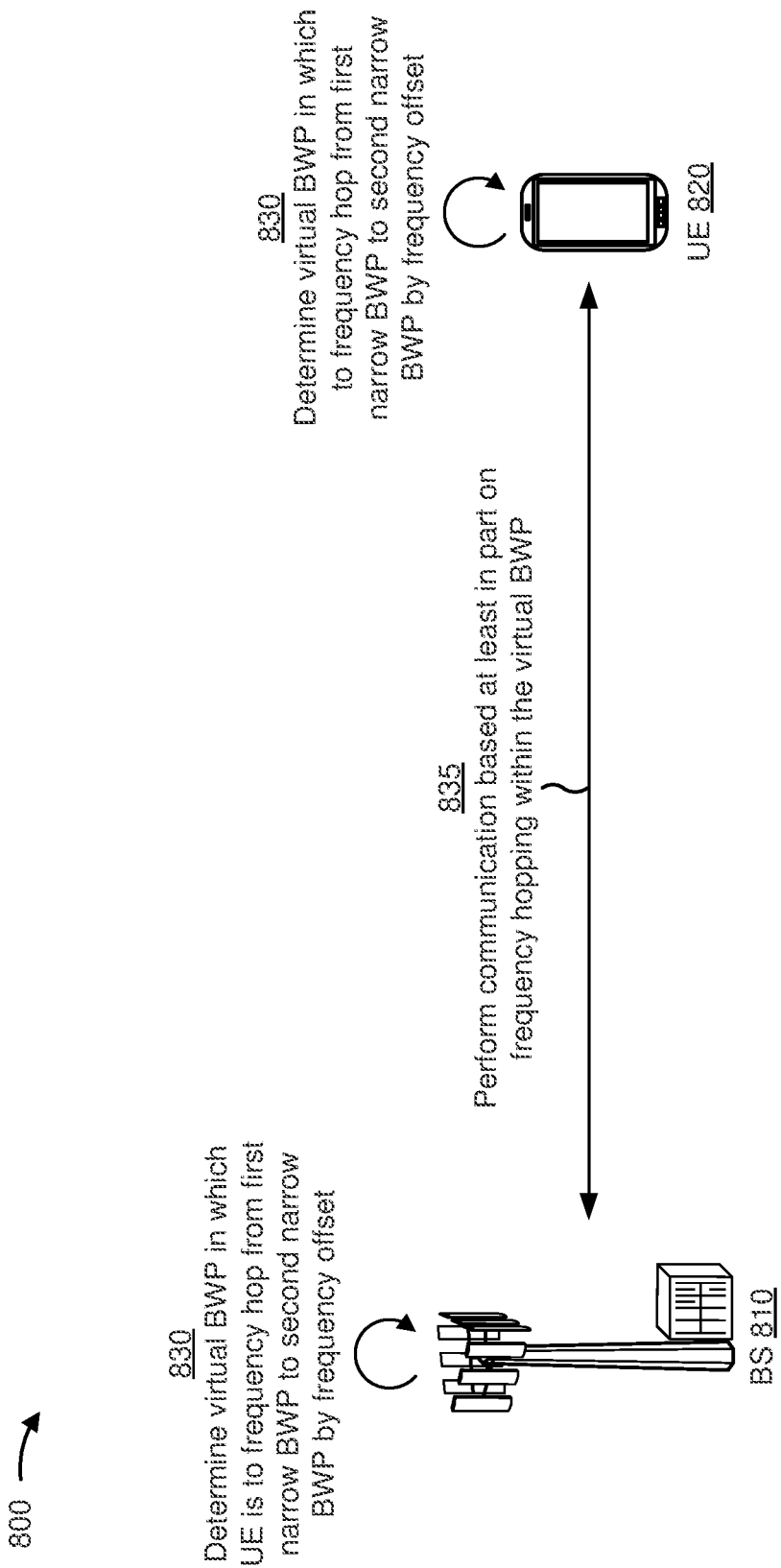
FIG. 8 is a diagram illustrating an example of frequency hopping within a virtual BWP, in accordance with various aspects of the present disclosure.

FIG. 8 is a diagram illustrating an example 800 of frequency hopping within a virtual BWP, in accordance with various aspects of the present disclosure. FIG. 8 shows a base station (BS) 810 (e.g., BS 110 depicted in FIGS. 1 and 2) that may communicate with a UE 820 (e.g., UE 120 depicted in FIGS. 1 and 2).

As shown by reference number 830, BS 810 may determine a virtual BWP in which to frequency hop from a first narrow BWP to a second narrow BWP by a frequency offset. The virtual BWP may have a same SCS as the first narrow BWP and a different starting frequency location and bandwidth than the first narrow BWP. The virtual BWP may have a larger bandwidth than the first narrow BWP. The bandwidth of the virtual BWP may be larger than a maximum channel bandwidth for a UE. As shown by reference number 830, UE 820 may also determine the virtual BWP. BS 810 may indicate the virtual BWP to UE 820, or BS 810 and UE 820 may have stored configuration information that specifies the virtual BWP.

As shown by reference number 835, BS 810 and UE 820 may perform communication based at least in part on frequency hopping within the virtual BWP. Both BS 810 and UE 820 may determine the virtual BWP and the same frequency hopping pattern to use so that transmissions carried out on frequencies that follow the pattern may be received at those frequencies.

As indicated above, FIG. 8 is provided as an example. Other examples may differ from what is described with regard to FIG. 8.

In some aspects, BS 810 may indicate a frequency offset to UE 820. The frequency offset may be based at least in part on the virtual BWP. Currently for intra-BWP frequency hopping, the offset may be indicated by 1-2 bits of a frequency domain resource assignment (FDRA) field in a DCI message. For a BWP smaller than 50 physical resource blocks (PRBs), BS 810 may indicate one of two radio resource control (RRC) configured offsets in an uplink (UL) grant. For a BWP equal to or greater than 50 PRBs, BS 810 may indicate one of 4 RRC configured offsets in the UL grant. Unlike intra-BWP hopping, a quantity of hopping offsets for cross-BWP frequency hopping may not be based on a size of the BWP, since hopping is allowed to cross BWPs. UE 820 may support up to four RRC configured offsets, even for a small BWP size.

Reusing FDRA bits to indicate up to 4 hopping offsets may heavily limit scheduling flexibility for a small BWP size, and thus it may be desirable to add one additional bit in the DCI. In some aspects, BS 810 may jointly encode an additional bit with a bit (e.g., most significant bit (MSB)) of a FDRA field to indicate one of the 4 configured hopping offsets. For example, BS 810 may use one bit to select 2 out of 4 configured offsets and then use one bit (MSB) of the FDRA field to further select a hopping offset from the 2 selected offsets.

Figure 9:
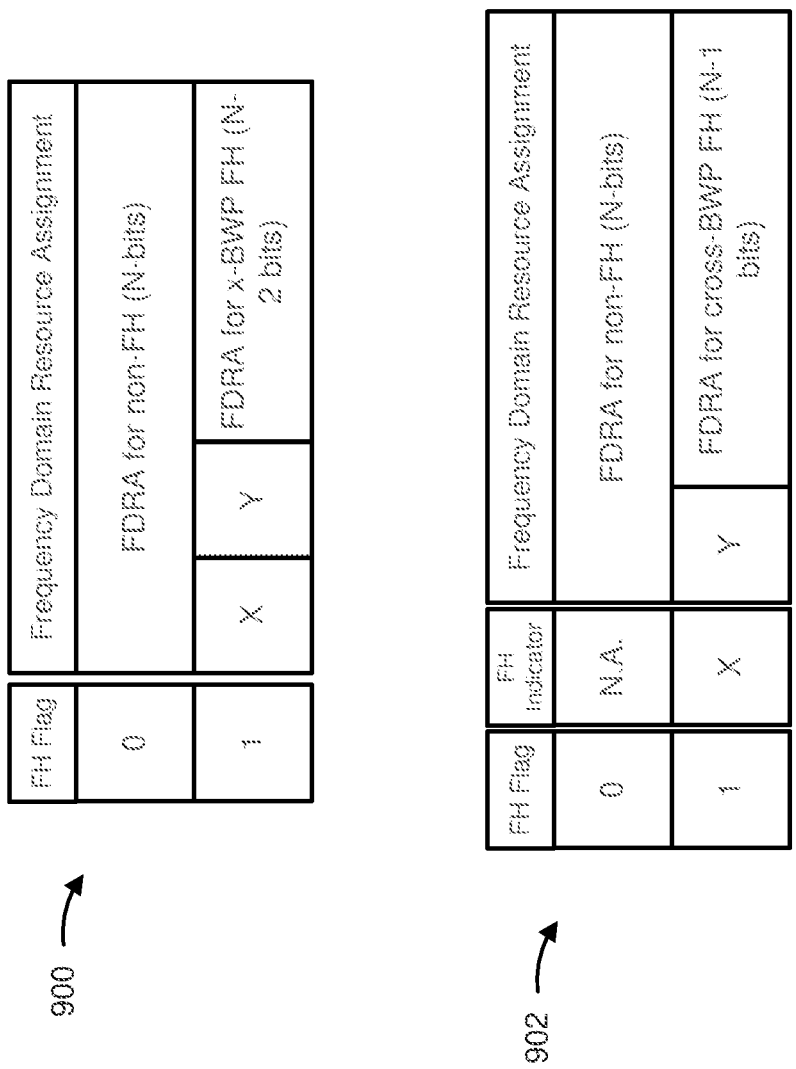
FIG. 9 illustrates example bit tables for indicating a frequency offset, in accordance with various aspects of the present invention.

FIG. 9 illustrates example bit tables 900, 902 for indicating a frequency offset, in accordance with various aspects of the present invention.

If a frequency hopping flag is set to true, BS 810 may use bits of table 900 to indicate a frequency offset, and UE 820 may use bits of table 900 to determine the frequency offset. Table 900 shows reusing 2 MSB bits of FDRA to indicate up to 4 hopping offsets with a same DCI size. Table 902 shows adding 1 bit with joint encoding with 1 MSB of FDRA to indicate up to 4 configured frequency hopping offsets. If a frequency hopping (FH) indicator bit is 0, frequency hopping may be cross-BWP hopping with either a first configured offset or a second configured offset. If a first MSB FDRA bit is 0, the first configured offset is used. Otherwise, the second configured offset is used. If the FH indicator bit is 1, frequency hopping may be cross-BWP hopping with either a third configured offset or a fourth configured offset. If a first MSB FDRA bit is 0, the third configured offset is used. Otherwise, the fourth configured offset is used.

As indicated above, FIG. 9 is provided as an example. Other examples may differ from what is described with regard to FIG. 9.

FIG. 10 illustrates example bit table 1000 for indicating frequency hopping, in accordance with various aspects of the present invention.

BS 810 may jointly encode bits with a 1-bit FH flag to support dynamic switching between intra-BWP frequency hopping and cross-BWP frequency hopping. That is, 2 bits may be used for the FH indicator. If the FH indicator is 00, there may be no frequency hopping. If the FH indicator is 01, there may be intra-BWP hopping with 2 RRC configured offsets. If 1-bit MSB FDRA=0, the first configured offset may be used. Otherwise, the second configured offset may be used. If the FH indicator is 10, there may be cross-BWP hopping with either the first configured offset or the second configured offset. If 1-bit MSB FDRA=0, the first configured offset may be used. Otherwise, the second configured offset may be used. If the FH indicator is 11, there may be cross-BWP hopping with either the third configured offset or the fourth configured offset. If 1-bit MSB FDRA=0, the third configured offset may be used. Otherwise, the fourth configured offset may be used. The bits may indicate a pattern for the frequency hopping within the narrow BWP or within the virtual BWP.

As indicated above, FIG. 10 is provided as an example. Other examples may differ from what is described with regard to FIG. 10.

FIG. 11 illustrates example bit tables 1100, 1102, and 1104 for indicating a resource allocation, in accordance with various aspects of the present invention.

When both type 0 and type 1 resource allocation are configured, currently, the 1-bit MSB of FDRA field is used to indicate type 0 and type 1 resource allocation and FH is only applied to resource allocation type 1 (refer to table 1100). In some aspects, BS 810 may jointly encode the 1-bit FH flag and 1-bit MSB of FDRA to indicate type 0 or type 1 resource allocation, and cross-BWP FH for type 1 resource allocation (see table 1102). In some aspects, BS 810 may jointly encode the 1-bit FH flag, 1-bit new FH indicator and 1-bit MSB of FDRA to indicate type 0 or type 1 resource allocation, and/or intra-BWP or cross-BWP FH for type 1 resource allocation (see table 1104).

As indicated above, FIG. 11 is provided as an example. Other examples may differ from what is described with regard to FIG. 11.

Figure 12:
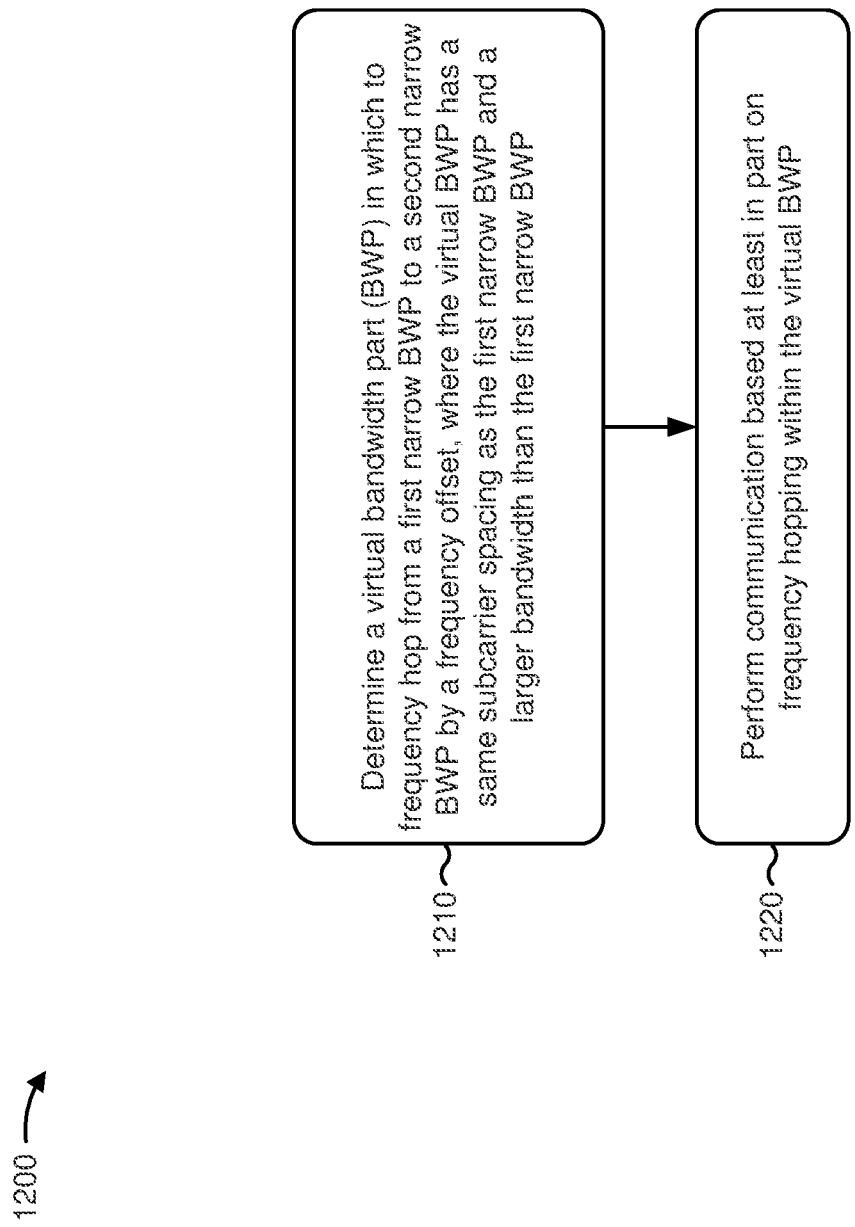
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 depicted in FIGS. 1 and 2, UE 820 depicted in FIG. 8, and/or the like) performs operations associated with frequency hopping within a virtual BWP.

As shown in FIG. 12, in some aspects, process 1200 may include determining a BWP in which to frequency hop from a first narrow BWP to a second narrow BWP by a frequency offset (block 1210). For example, the UE (e.g., using receive processor 258, transmit processor 264, controller/processor 280, memory 282, and/or the like) may determine a virtual BWP in which to frequency hop from a first narrow BWP to a second narrow BWP by a frequency offset, as described above. In some aspects, the virtual BWP has a same subcarrier spacing as the first narrow BWP and larger bandwidth than the first narrow BWP.

As further shown in FIG. 12, in some aspects, process 1200 may include performing communication based at least in part on frequency hopping within the virtual BWP (block 1220). For example, the UE (e.g., using receive processor 258, transmit processor 264, controller/processor 280, memory 282, and/or the like) may perform communication based at least in part on frequency hopping within the virtual BWP, as described above.

Process 1200 may include additional aspects, such as any single aspect or any combination of aspects described below and/or in connection with one or more other processes described elsewhere herein.

In a first aspect, process 1200 includes determining a starting frequency resource for the frequency hopping based at least in part on the bandwidth of the virtual BWP and a size of the frequency offset.

In a second aspect, alone or in combination with the first aspect, wherein a starting frequency location of the virtual BWP is different than a starting frequency location of the first narrow BWP, and process 1200 includes determining a starting frequency resource for the frequency hopping based on a difference between the starting frequency location of the virtual BWP and a starting frequency location of the first narrow BWP.

In a third aspect, alone or in combination with one or more of the first and second aspects, the virtual BWP is larger than a maximum channel bandwidth for a UE and the first narrow BWP is equal to or smaller than the maximum channel bandwidth for the UE.

In a fourth aspect, alone or in combination with one or more of the first through third aspects, process 1200 includes determining the frequency offset based at least in part on a frequency hopping indicator bit in downlink control information.

In a fifth aspect, alone or in combination with one or more of the first through fourth aspects, the frequency hopping indicator bit is jointly encoded with a frequency domain resource assignment bit to indicate a frequency offset from among a set of configured offsets.

In a sixth aspect, alone or in combination with one or more of the first through fifth aspects, process 1200 includes determining the frequency offset based at least in part on a joint encoding of a flag bit, a frequency hopping indicator bit, and a frequency domain resource assignment bit in downlink control information.

In a seventh aspect, alone or in combination with one or more of the first through sixth aspects, process 1200 includes determining a pattern for the frequency hopping based at least in part on the joint encoding of the flag bit, the frequency hopping indicator bit, and the frequency domain resource assignment bit in the downlink control information.

In an eighth aspect, alone or in combination with one or more of the first through seventh aspects, the pattern for the frequency hopping is one of frequency hopping within the first narrow BWP or frequency hopping within the virtual BWP.

In a ninth aspect, alone or in combination with one or more of the first through eighth aspects, process 1200 includes determining a type of resource allocation based at least in part on a joint encoding of a flag bit, a frequency hopping indicator bit, and a frequency domain resource assignment bit in downlink control information, and performing the communication includes performing the frequency hopping within the virtual BWP based at least in part on the type of resource allocation.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
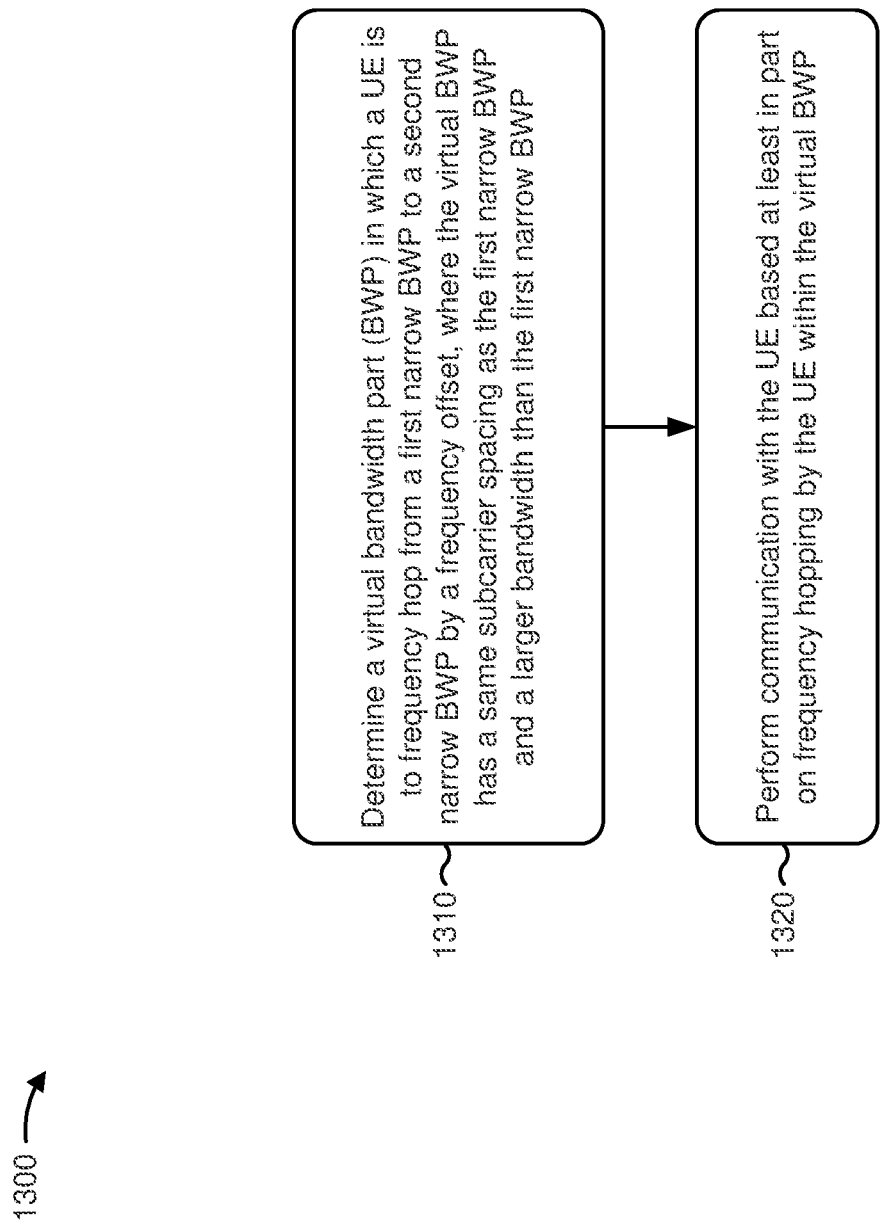
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., BS 110 depicted in FIGS. 1 and 2, BS 810 depicted in FIG. 8, and/or the like) performs operations associated with frequency hopping within a virtual BWP.

As shown in FIG. 13, in some aspects, process 1300 may include determining a virtual BWP in which a UE is to frequency hop from a first narrow BWP to a second narrow BWP by a frequency offset (block 1310). For example, the base station (e.g., using transmit processor 220, receive processor 238, controller/processor 240, memory 242, and/or the like) may determine a virtual BWP in which a UE is to frequency hop from a first narrow BWP to a second narrow BWP by a frequency offset, as described above. In some aspects, the virtual BWP has a same subcarrier spacing as the first narrow BWP and a larger bandwidth than the first narrow BWP.

As further shown in FIG. 13, in some aspects, process 1300 may include performing communication with the UE based at least in part on frequency hopping by the UE within the virtual BWP (block 1320). For example, the base station (e.g., using transmit processor 220, receive processor 238, controller/processor 240, memory 242, and/or the like) may perform communication with the UE based at least in part on frequency hopping by the UE within the virtual BWP, as described above.

Process 1300 may include additional aspects, such as any single aspect or any combination of aspects described below and/or in connection with one or more other processes described elsewhere herein.

In a first aspect, process 1300 includes transmitting information indicating the virtual BWP.

In a second aspect, alone or in combination with the first aspect, a starting frequency resource for the frequency hopping is based at least in part on the bandwidth of the virtual BWP and a size of the frequency offset.

In a third aspect, alone or in combination with one or more of the first and second aspects, a starting frequency location of the virtual BWP is different than a starting frequency location of the first narrow BWP, and a starting frequency resource for the frequency hopping is based on a difference between the starting frequency location of the virtual BWP and a starting frequency location of the first narrow BWP.

In a fourth aspect, alone or in combination with one or more of the first through third aspects, the virtual BWP is larger than a maximum channel bandwidth for a UE and the first narrow BWP is equal to or smaller than the maximum channel bandwidth for the UE. The virtual BWP may be larger than a wideband BWP for a premium UE.

In a fifth aspect, alone or in combination with one or more of the first through fourth aspects, process 1300 includes transmitting an indication of the frequency offset by a frequency hopping indicator bit in downlink control information.

In a sixth aspect, alone or in combination with one or more of the first through fifth aspects, process 1300 includes transmitting an indication of the frequency offset by jointly encoding a frequency domain resource assignment bit and a frequency hopping indicator bit in downlink control information.

In a seventh aspect, alone or in combination with one or more of the first through sixth aspects, process 1300 includes transmitting an indication of the frequency offset by jointly encoding a flag bit, a frequency hopping indicator bit, and a frequency domain resource assignment bit in downlink control information.

In an eighth aspect, alone or in combination with one or more of the first through seventh aspects, process 1300 includes transmitting an indication of a pattern for frequency hopping based at least in part on the joint encoding of the flag bit, the frequency hopping indicator bit, and the frequency domain resource assignment bit in the downlink control information.

In a ninth aspect, alone or in combination with one or more of the first through eighth aspects, the pattern is one of frequency hopping within the first narrow BWP or frequency hopping with the virtual BWP.

In a tenth aspect, alone or in combination with one or more of the first through ninth aspects, process 1300 includes transmitting an indication of a type of resource allocation based at least in part on jointly encoding a flag bit, a frequency hopping indicator bit, and a frequency domain resource assignment bit in downlink control information.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a virtual bandwidth part (BWP) in which to frequency hop from a first narrow BWP to a second narrow BWP by a frequency offset, wherein the virtual BWP has a same subcarrier spacing as the first narrow BWP, and wherein a bandwidth of the virtual BWP is larger than a bandwidth of the first narrow BWP; and
   performing communication based at least in part on frequency hopping within the virtual BWP.

2. The method of claim 1, further comprising determining a starting frequency resource for the frequency hopping based at least in part on the bandwidth of the virtual BWP and a size of the frequency offset.

3. The method of claim 2, wherein a starting frequency location of the virtual BWP is different than a starting frequency location of the first narrow BWP, and wherein the method further comprises determining the starting frequency resource for the frequency hopping based on a difference between the starting frequency location of the virtual BWP and the starting frequency location of the first narrow BWP.

4. The method of claim 1, wherein the virtual BWP is larger than a maximum channel bandwidth for the UE and the first narrow BWP is equal to or smaller than the maximum channel bandwidth for the UE.

5. The method of claim 1, further comprising determining the frequency offset based at least in part on a frequency hopping indicator bit in downlink control information.

6. The method of claim 5, wherein the frequency hopping indicator bit is jointly encoded with a frequency domain resource assignment bit to indicate the frequency offset from among a set of configured offsets.

7. The method of claim 1, further comprising determining the frequency offset based at least in part on a joint encoding of a flag bit, a frequency hopping indicator bit, and a frequency domain resource assignment bit in downlink control information.

8. The method of claim 7, further comprising determining a pattern for the frequency hopping based at least in part on the joint encoding of the flag bit, the frequency hopping indicator bit, and the frequency domain resource assignment bit in the downlink control information.

9. The method of claim 8, wherein the pattern for the frequency hopping is one of frequency hopping within the first narrow BWP or frequency hopping within the virtual BWP.

10. The method of claim 1, further comprising determining a type of resource allocation based at least in part on a joint encoding of a flag bit, a frequency hopping indicator bit, and a frequency domain resource assignment bit in downlink control information, and wherein performing the communication includes performing the frequency hopping within the virtual BWP based at least in part on the type of resource allocation.

11. A method of wireless communication performed by a base station, comprising:
    determining a virtual bandwidth part (BWP) in which a user equipment (UE) is to frequency hop from a first narrow BWP to a second narrow BWP by a frequency offset, wherein the virtual BWP has a same subcarrier spacing as the first narrow BWP, and wherein a bandwidth of the virtual BWP is larger than a bandwidth of the first narrow BWP; and
    performing communication with the UE based at least in part on frequency hopping by the UE within the virtual BWP.

12. The method of claim 11, further comprising transmitting information indicating the virtual BWP.

13. The method of claim 11, wherein a starting frequency resource for the frequency hopping is based at least in part on the bandwidth of the virtual BWP and a size of the frequency offset.

14. The method of claim 13, wherein a starting frequency location of the virtual BWP is different than a starting frequency location of the first narrow BWP, and the starting frequency resource for the frequency hopping is based on a difference between the starting frequency location of the virtual BWP and the starting frequency location of the first narrow BWP.

15. The method of claim 11, wherein the virtual BWP is larger than a maximum channel bandwidth for the UE and the first narrow BWP is equal to or smaller than the maximum channel bandwidth for the UE.

16. The method of claim 11, further comprising transmitting an indication of the frequency offset by a frequency hopping indicator bit in downlink control information.

17. The method of claim 11, further comprising transmitting an indication of the frequency offset by jointly encoding a frequency domain resource assignment bit and a frequency hopping indicator bit in downlink control information.

18. The method of claim 11, further comprising transmitting an indication of the frequency offset by jointly encoding a flag bit, a frequency hopping indicator bit, and a frequency domain resource assignment bit in downlink control information.

19. The method of claim 18, further comprising transmitting an indication of a pattern for frequency hopping based at least in part on the joint encoding of the flag bit, the frequency hopping indicator bit, and the frequency domain resource assignment bit in the downlink control information.

20. The method of claim 19, wherein the pattern is one of frequency hopping within the first narrow BWP or frequency hopping with the virtual BWP.

21. The method of claim 11, further comprising transmitting an indication of a type of resource allocation based at least in part on jointly encoding a flag bit, a frequency hopping indicator bit, and a frequency domain resource assignment bit in downlink control information.

22. A user equipment (UE) for wireless communication, comprising:
a memory; and
one or more processors coupled to the memory and configured to:
determine a virtual bandwidth part (BWP) in which to frequency hop from a first narrow BWP to a second narrow BWP by a frequency offset, wherein the virtual BWP has a same subcarrier spacing as the first narrow BWP, and wherein a bandwidth of the virtual BWP is larger than a bandwidth of the first narrow BWP; and
perform communication based at least in part on frequency hopping within the virtual BWP.

23. The UE of claim 22, wherein the one or more processors are configured to determine a starting frequency resource for the frequency hopping based at least in part on the bandwidth of the virtual BWP and a size of the frequency offset.

24. The UE of claim 23, wherein a starting frequency location of the virtual BWP is different than a starting frequency location of the first narrow BWP, and wherein the one or more processors are configured to determine the starting frequency resource for the frequency hopping based on a difference between the starting frequency location of the virtual BWP and the starting frequency location of the first narrow BWP.

25. The UE of claim 22, wherein the virtual BWP is larger than a maximum channel bandwidth for the UE and the first narrow BWP is equal to or smaller than the maximum channel bandwidth for the UE.

26. The UE of claim 22, wherein the one or more processors are configured to determine the frequency offset based at least in part on a frequency hopping indicator bit in downlink control information.

27. The UE of claim 26, wherein the frequency hopping indicator bit is jointly encoded with a frequency domain resource assignment bit to indicate the frequency offset from among a set of configured offsets.

28. The UE of claim 26, wherein the one or more processors are configured to determine the frequency offset further based at least in part on a joint encoding of a flag bit, a frequency hopping indicator bit, and a frequency domain resource assignment bit in downlink control information.

29. The UE of claim 28, wherein the one or more processors are configured to determine a pattern for the frequency hopping based at least in part on the joint encoding of the flag bit, the frequency hopping indicator bit, and the frequency domain resource assignment bit in the downlink control information, and wherein the pattern for the frequency hopping is one of frequency hopping within the first narrow BWP or frequency hopping within the virtual BWP.

30. A base station for wireless communication, comprising:
a memory; and
one or more processors coupled to the memory and configured to:
determine a virtual bandwidth part (BWP) in which a user equipment (UE) is to frequency hop from a first narrow BWP to a second narrow BWP by a frequency offset, wherein the virtual BWP has a same subcarrier spacing as the first narrow BWP, and wherein a bandwidth of the virtual BWP is larger than a bandwidth of the first narrow BWP; and
perform communication with the UE based at least in part on frequency hopping by the UE within the virtual BWP.

\* \* \* \* \*